United States Patent Office 3,326,739
Patented June 20, 1967

3,326,739
LOW GLOSS FILM
James Leo Brennan, Niagara Falls, William Locke Bryan, Tonawanda, and Richard Joseph Kieffer, Buffalo, N.Y., assignors to E. I. du Pont de Nemours and Company, Wilmington, Del., a corporation of Delaware
No Drawing. Filed Oct. 4, 1962, Ser. No. 228,263
4 Claims. (Cl. 161—168)

This invention relates to improvements in organic polymeric films, and more particularly, to the provision of opaque polyvinyl fluoride films having low gloss ratings.

Polyvinyl fluoride is noted for its attractive properties, and in film form, possesses an unusual combination of excellent resistance to outdoor weathering exposures, a high degree of physical toughness, chemical inertness, abrasion resistance, resistance to soiling and the action of solvents as well as an amazing retention of these properties at both low and elevated temperatures. The above combination of properties not only strongly suggests many areas of use for polyvinyl fluoride in the form of self-supporting films, but also the use of such films as the outer layers of a wide variety of laminar structures destined chiefly for outdoor use wherein the polyvinyl fluoride films serve to upgrade less functional substrates, imparting to the final structure a degree of utility not to be found solely in either film or substrate.

Whether employed as self-supporting films or as film components of laminar structures to be employed as prefinished building siding and roofing in domestic, commercial and industrial installations, the polyvinyl fluoride film serves logically as the means for imparting to the structure both opacity and coloration effects, which may be desirable for both esthetic and functional reasons. And, in keeping with modern architectural trends requiring decorative, functional structures which exhibit a minimum or reflective glare, pigmented polyvinyl fluoride films exhibiting low specular gloss are in demand. Pigmented polyvinyl fluoride films, however, tend normally to exhibit a rather high specular gloss, typical films ranging in Gardner gloss rating from 65–90 at 85°. While mechanical scuffing or embossing might serve to reduce the gloss of pigmented polyvinyl fluoride films, such films would only serve effectively in self-supporting applications inasmuch as the effect of such gloss-reducing expedients is all but erased by the combined effect of heat and pressure employed in most laminating techniques.

An object of this invention therefore is to provide a pigmented polyvinyl fluoride film having a satisfactorily low gloss rating. A further object is to provide a colored opaque polyvinyl fluoride film characterized by a low gloss which is not substantially affected by conventional laminating techniques customarily employed in fabricating laminar structures surfaced with said film. The foregoing and related objects will more clearly appear in the detailed description which follows.

The objects are fully realized by the present invention which, briefly stated, comprises a polyvinyl fluoride film containing from 1% to 35% by weight, based on the total weight of the film, of an opacifying coloration pigment and from 2% to 15% by weight of a particulate calcium carbonate having less than 0.1% by weight, based on the weight of particulate calcium carbonate, of water soluble components expressed as NaCl and comprising particles of irregular and random shape ranging from 1 to 35 microns in average diameter, said polyvinyl fluoride film exhibiting a Gardner gloss rating not greater than 50 at 85°.

The pigmented polyvinyl fluoride films of this invention may be formed by procedures such as those described in U.S. Patent 2,953,818 combined with procedures for two-way stretching of latent solvent-containing polyvinyl fluoride films as set forth in U.S. application Ser. No. 801,441, filed Mar. 24, 1959, in the names of Robert S. Prengle and Robert L. Richards, Jr. One method of forming such films comprises feeding a mixture of latent solvent, pigment, particulate calcium carbonate and particulate polyvinyl fluoride to a heated extruder which is connected to a slotted casting hopper. A tough, coalesced extrudate of polyvinyl fluoride is continuously extruded in the form of a sheet or film containing latent solvent. This sheet or film is then preferably heated and stretched in one or more directions while solvent is volatilized therefrom. A thermal stabilizer may be incorporated in the mix fed to the extruder up to 2% by weight, based on the weight of total solids present. Any effective, commercially available stabilizer sold for the thermal stabilization of vinyl polymers may be employed.

While any convenient technique may be employed in preparing the mixtures to be fed to the extruder, a typical preparation which ensures the delivery of a mix having a high degree of homogenity is as follows: Initially, all of the particulate polyvinyl fluoride which is to be present in the mixture fed to the extruder is dispersed in a sufficient quantity of the latent solvent to provide a fluid, homogeneous dispersion which is passed through a 50-mesh screen (National Bureau of Standards) and delivered into a blend tank. Next, all of the opacifying coloration pigment is dispersed in an additional portion of the latent solvent until a rather concentrated but fluid homogeneous dispersion is obtained which is passed through a 325-mesh screen (NBS) and delivered into the same blend tank. Next, the particulate calcium carbonate is dispersed in an additional quantity of the latent solvent, passed through a 325-mesh screen (NBS) and delivered into the same blend tank. At this point up to 2% by weight of a thermal stabilizer, based on the total solids in the tank may be added. Additional latent solvent is added at this time to bring the solvent content of the mix in the blend tank up to 55–65% of the total weight, preferably 58–62%. While the contents of the blend tank are continuously and slowly mixed to maintain homogenity, the mixture is pumped to the extruder.

To keep the pigment loading level in the film below that above which certain important physical properties of the film begin to decline and yet simultaneously provide sufficient hiding power in thin polyvinyl fluoride films, the opacifying coloration pigments used in the preparation of the films of this invention are employed in as finely comminuted a state as can conveniently be obtained without serious economic penalty. The greater portion of the particles of the pigment components employed should have average diameters in the submicron range where a high level of coloration and opacification is accomplished at permissible pigment loading levels.

Although the pigments employed in the polyvinyl fluoride films of this invention are termed "opacifying," it should be understood that the films of this invention need not be opaque in the sense that they totally obstruct the passage of light. At the lower pigment loading levels, e. g. as little as 1% of the total weight, especially with the thinner films, highly decorative effects are realized with the varying degrees of low glare translucency that are available. Any coloration pigment or combination of coloration pigments, including whites and blacks as well as true spectral colors between these extremes may be employed for purposes of this invention. A preferred pigment is titania.

While refined, chemically pure calcium carbonate may be used, for economic reasons the naturally occurring forms of calcium carbonate such as limestone and marble are preferred. Most of the pigmented polyvinyl fluoride films of this invention will be employed outdoors in laminar constructions wherein they will be combined with substrates such as aluminum, cold rolled steel, galvanized and aluminized steels, plywood, grainless hardboards, asbestos-cement boards, asphalt-impregnated cellulosic boards and other plastic materials including in situ-cured, glass fiber-reinforced polyester structures. Therefore the preservation of a highly durable interfacial bond between the polyvinyl fluoride film and the substrate during long term hydrolytic attack consequent with outdoor exposure is essential. Toward this end it has been found necessary to employ calcium carbonate in forms in which it contains preferably not more than 0.1% by weight of water-soluble components, expressed as NaCl as determined by conductivity measurements. The presence of water-soluble components in excess of this level has been associated with unacceptably short lived interfacial bonds during selective accelerated hydrolytic exposures which correlate well with actual outdoor exposures. Of the commercially available, naturally occurring forms of calcium carbonate, water-ground limestones and marbles are preferred inasmuch as this method of comminution tends to remove the bulk of any water-soluble components present and results in products having less than the maximum tolerable percent of water-soluble components.

Particulate calcium carbonate candidates are examined to determine whether or not they meet the "water-soluble components" requirements by testing in the following manner: Three 250-ml. Erlenmeyer flasks are rinsed with deionized water at 25° C. (conductivity=$3 \times 10^{-6}$ mhos/cm.). Then 2.0, 4.0 and 6.0 grams of the candidate particulate calcium carbonate is added to each of the three flasks respectively, followed in each case by 100 ml. of the deionized water. The flasks are allowed to stand at 25° C. for three hours with occasional shaking. Meanwhile, three glass filter funnels are prepared with filter paper which is standardized by rinsing with successive 100 ml. volumes of the deionized water until the conductivity of the effluent is $3 \times 10^{-6}$ mhos/cm. in each case, checking periodically with a standard conductivity bridge and cell. The calcium carbonate slurry in each flask is then filtered and the conductivity of each filtrate measured at 25° C. An arithmetic plot of conductivity, L, mhos/cm., vs. concentration, C, g./liter, is made, drawing the best fitting straight line through the data points. The slope of this line, $dL/dC$ is a measure of the concentration of the soluble ionic components in the calcium carbonate and is expressed as $$\frac{\text{mhos/cm.}}{\text{g./liter}}$$

To convert to a percent of the calcium carbonate expressed as NaCl, $dL/dC$ is multiplied in turn by the grams/equivalent for NaCl (i.e., 58.5) and by 1000 cc./liter, then divided by the sum of the equivalent conductances of the sodium and chloride ions at 25° C. (i.e., 126.4), expressed as $$\frac{\text{mhos/cm.}}{\text{equiv./cc.}}$$

The answer is expressed as g. of NaCl/g. of $CaCO_3$ and is converted to a percent by multiplying by 100. A typical calculation defining the maximum tolerable limit of 0.1% water-soluble components follows:

Percent water-soluble components (expressed as NaCl) in $CaCO_3$=

$$\frac{2.16 \times 10^{-6} \text{ mhos/cm.} \times 58.5 \text{ g. of NaCl/equiv.} \times 1000 \text{ cc./liter} \times 100}{\text{g. of } CaCO_3/\text{liter}}{126.4 \frac{\text{mhos/cm.}}{\text{equiv./cc.}}} = 0.1$$

Particulate calcium carbonate ranging from 1 to 35 microns in average particle diameter is employed in preparing the polyvinyl fluoride films of this invention. This range of particle size has been found useful for obtaining the greatest reduction in gloss at loadings that cause no serious decline in important physical properties of the film. Particulate calcium carbonates having the greater portion of their particles ranging from 5 to 20 microns in average particle diameter are preferred. Particulate calcium carbonates within the broader particle size range specified above may be employed in the preparation of the low gloss pigmented polyvinyl fluoride films of this invention, being present in the mixtures fed to the extruder to the extent that they constitute from 2% to 15% by weight of the final film, based on the total weight thereof. Below the 2% level, Gardner gloss ratings of 50 or less at 85° are not generally obtained. At much above the 15% level it becomes increasingly difficult to extrude polyvinyl fluoride films from feed mixes containing sufficient pigment to provide functional opacity in films as thin as 1 mil.

The examples which follow will serve to further illustrate the principles and practice of the invention.

*Example 1*

Following the previously described procedure for preparing the film-forming composition, the blend tank was charged with 450 pounds of N,N-dimethylacetamide, 237 pounds of particulate polyvinyl fluoride, 45 pounds of rutile titania, 3 pounds of a vinyl stabilizer of the metallic salt variety and 18 pounds of water-ground marble comprising chiefly particles ranging from 2 to 30 microns in average diameter and wherein the greater portion of the particles ranged in average diameter from 5 to 20 microns. This mixture was continuously pumped to a heated extruder connected to a slotted casting hopper 27 inches long with an average lip spacing of 22 mils, from which issued (at about 155° C.) a coalesced, latent solvent-containing polyvinyl fluoride film which was immediately cooled by conducting it through a water-quench bath maintained at about 5° C. The casting draw-down was adjusted so that the quenched film averaged about 14.5 mils in thickness. This latent solvent-containing film was then continuously stretched first longitudinally 1.5× at 70° C. and then transversely 2.2× at a temperature in the range of 120° C. to 195° C., followed by "drying," i.e. volatilization of remaining dimethylacetamide by exposure for about 6 seconds to an ambient temperature in the range of 190° to 195° C. The resulting 1.5 mil thick polyvinyl fluoride film exhibited a Gardner gloss rating of 22 at 85°.

A control film, Control A was prepared in the same manner as the film of Example 1 except that the feed mixture contained 255 pounds of polyvinyl fluoride and did not contain any water-ground marble. The resulting 1.5 mil thick control film exhibited a Gardner gloss rating of 75 at 85°.

Gardner gloss ratings of film samples were measured in accordance with the Tentative Method of Test for Specular Gloss, ASTM designation: D523–53T, without applying the Diffuse Correction (see Section 8 of Method of Test). The apparatus employed in carrying out these measurements is a model AU–10a Glossmeter with automatic photometric unit, in combination with model UX–5 85° gloss head, manufactured by Henry A. Gardner Laboratory, Inc., Bethesda, Md. The film sample is mounted on a flat stage and the gloss head placed on the sample so that the incident light beam is aimed in the machine direction of the sample, i.e. the direction in which the film passed through the film manufacturing apparatus. Readings are taken from five randomly selected film samples and the arithmetic average is recorded.

*Example 2*

The blend tank was charged with 2250 pounds of dimethylacetamide, 52.5 pounds of rutile titania, 223.5 pounds of polyvinyl fluoride, 3 pounds of the thermal stabilizer and 24 pounds of the same water-ground marble as was used for Example 1. A film was cast, stretched and dried according to the procedure of Example 1. The resulting 1.5 mil thick polyvinyl fluoride film exhibited a Gardner gloss rating of 17 at 85°.

*Example 3*

The blend tank was charged with 250 pounds of dimethylacetamide, 1230 pounds of polyvinyl fluoride, 132 pounds of rutile titania, 2 pounds of lamp black, 38 pounds of Harshaw Sun Yellow C (a titanium yellow), 1.5 pounds of Harshaw Cadmium-Selenide Medium Red, 15 pounds of the stabilizer of Examples 1 and 2 and 90 pounds of the same water-ground marble employed for Examples 1 and 2. A film was cast, stretched and dried according to the procedure given for Example 1. The resulting 1.5 mil thick polyvinyl fluoride film exhibited a Gardner gloss rating of 23 at 85°.

A control film, Control B was prepared in the same manner as the film of Example 3 except that the feed mixture contained 1320 pounds of polyvinyl fluoride and did not contain any water-ground marble. The resulting 1.5 mil thick control film exhibited a Gardner gloss rating of 73 at 85°.

*Example 4*

The blend tank was charged with 2250 pounds of dimethylacetamide, 1230 pounds of polyvinyl fluoride, 165 pounds of rutile titania, 2.75 pounds of lamp black, 11 pounds of Chrome Yellow [1], 2.75 pounds of Monastral Green, 15 pounds of the previously employed metallic salt stabilizer and 90 pounds of the same water-ground marble as was employed for the previous examples. A film was cast, stretched and dried according to the procedure of Example 1. The resulting 1.5 mil thick polyvinyl fluoride film exhibited a Gardner gloss rating of 21 at 85°.

A control film, Control C was prepared in the same manner as the film of Example 4 except that the feed mixture contained 1320 pounds of polyvinyl fluoride and did not contain any water-ground marble. The resulting 1.5 mil thick control film exhibited a Gardner gloss rating of 70 at 85°.

*Example 5*

The blend tank was charged with the same quantities and relative proportions as for Example 4 except that gamma-butyrolactone was substituted for dimethylacetamide. A film was cast, stretched and dried according to the procedure of Example 1, except that the extrusion temperature was about 175° C. and the "drying" required an 11 second exposure at an ambient temperature in the range of 195° C. to 200° C. The resulting 1.5 mil thick polyvinyl fluoride film exhibited a Gardner gloss rating of 22 at 85°.

*Examples 6 to 14*

Following the procedure of Example 1, a series of 1.5 mil thick white polyvinyl fluoride films of reduced gloss was manufactured while varying both the concentration and the particle size distribution of the calcium carbonate employed. Details are shown in Table I below.

TABLE I

| Example | Percent of Solids | | | Particle Size Distribution of $CaCO_3$, microns | Gardner Gloss Reading at 85° |
|---|---|---|---|---|---|
| | Rutile Titania | Calcium Carbonate | Polyvinyl Fluoride | | |
| 6 | 17.5 | 4 | 78.5 | 3-30 | 40 |
| 7 | 17.5 | 6 | 76.5 | 3-30 | 33 |
| 8 | 17.5 | 8 | 74.5 | 3-30 | 21 |
| 9 | 17.5 | 10 | 72.5 | 1-16 | 27 |
| 10 | 17.5 | 12 | 70.5 | 1-16 | 26 |
| 11 | 17.5 | 6 | 76.5 | 2-35 | 28 |
| 12 | 17.5 | 2 | 80.5 | 2-35 | 48 |
| 13 | 17.5 | 8 | 74.5 | 1-25 | 32 |
| 14 | 17.5 | 10 | 72.5 | 1-25 | 27 |

The pigmented polyvinyl fluoride films of this invention exhibit a markedly reduced specular reflectance (i.e. gloss) which, for esthetic reasons, enhances their utility in many applications.

We claim:
1. A polyvinyl fluoride film containing from 1% to 35% by weight, based on the total weight of the film, of an opacifying coloration pigment and from 2% to 15% by weight of a particulate calcium carbonate having less than 0.1% by weight, based on the weight of particulate calcium carbonate, of water-soluble components expressed as NaCl and comprising particles of irregular and random shape ranging from 1 to 35 microns in average diameter, said polyvinyl fluoride film exhibiting a Gardner gloss rating not greater than 50 at 85°.
2. The product of claim 1 wherein said film is biaxially oriented.
3. The product of claim 1 wherein said opacifying coloration pigment comprises titania.
4. The product of claim 3 wherein said film is biaxially oriented.

References Cited

UNITED STATES PATENTS 1,966,856   7/1934   Groff.
2,953,818   9/1960   Bartron _____ 18—570

ALEXANDER WYMAN, *Primary Examiner.*

EARL M. BERGERT, JACOB STEINBERG,
*Examiners.*

J. T. PIRKEY, R. A. FLORES, *Assistant Examiners.*

---
[1] Coloration pigments commercially available from E. I. du Pont de Nemours and Company, Wilmington, Del.